July 13, 1965 H. J. HACKETT 3,194,746
LOCATING MEANS FOR POSITIONING NUCLEAR FUEL COMPONENTS
Filed Feb. 15, 1963
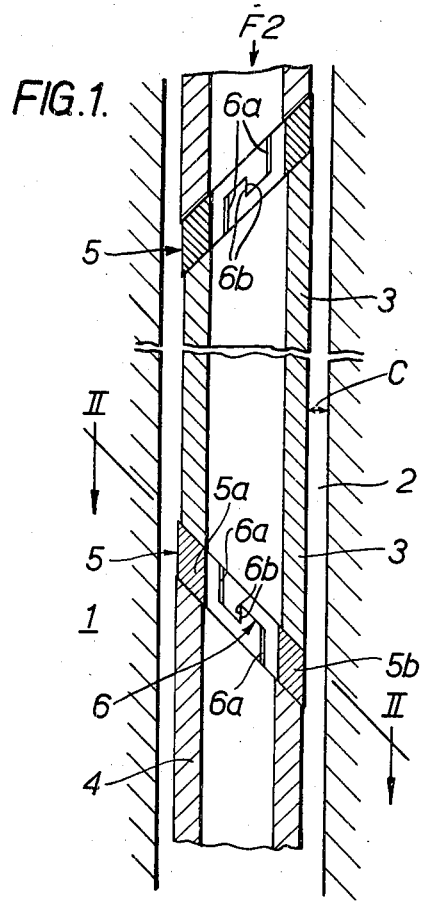
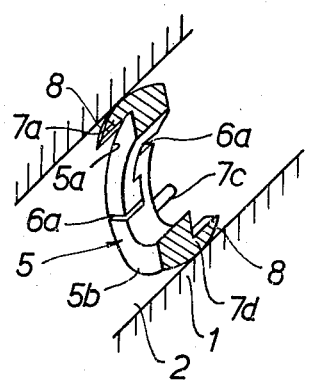
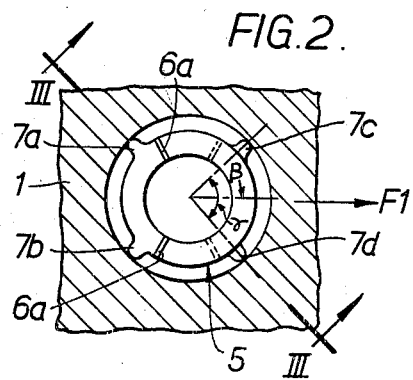

United States Patent Office 3,194,746
Patented July 13, 1965

3,194,746
LOCATING MEANS FOR POSITIONING NUCLEAR FUEL COMPONENTS
Herman Joseph Hackett, Jumpers, Christchurch, England, assignor to United Kingdom Atomic Energy Authority, London, England
Filed Feb. 15, 1963, Ser. No. 258,783
Claims priority, application Great Britain, Feb. 20. 1962, 6,502/62
2 Claims. (Cl. 176—77)

This invention relates to nuclear reactor and to spacing or locating means for positioning nuclear fuel components one above the other in longitudinally extending channels formed in nuclear moderating material.

It has already been proposed hitherto to position fuel components, in the form of fuel cartridges, correctly in a passage by forming oblique surfaces on the abutting ends of fuel cartridges such that the application of a downward axial force to the carriages given rise to a radial component which is used to establish contact between projections on the cartridges and the passage wall. The present invention aims to provide an improved method of achieving this effect which will accommodate dimensional changes between fuel components, obviate the need for forming special shapes from nuclear fuel material and reduce the risk of adjacent fuel components particularly uncanned fuel components from sticking together under operational conditions.

Moreover with uncanned ceramic or cermet fuel components the nature of the material favors manufacture in short tubular length and hitherto no completely suitable method of supporting such lengths under operational conditions is known.

According to the invention, in an assembly of elongated fuel components having oblique end faces arranged end to end in a channel within moderating material, there is provided a spacer member adapted for interposition between the adjacent ends of nuclear fuel components, said spacer member having peripheral projections which extend between the fuel components and the wall of the channel thereby serving to locate the components with respect to the wall. The channel preferably extends vertically. The disposition of the projections on the spacer member is such that on the one hand the radial component due to the axially downward force, which is set up at the oblique end faces is transmitted to the channel wall, so thereby positioning the components with respect to the wall, and on the other hand the components can undergoe dimensional changes in radial planes substantially without restraint.

An embodiment of the invention will now be described with reference to the accompanying drawings in which, FIG. 1 is an axial cross-section through a vertically extending channel containing nuclear fuel.

FIG. 2 is a cross section on the line II—II of FIG. 1.

FIG. 3 is a cross section on the line III—III through the channel showing the disposition of a spacer member therein.

Referring to the drawings, there is shown a block of moderator material 1 which can form part of a reactor core having a vertical coolant channel 2 therein for superimposed tubular fuel compacts or components referred to in the following as fuel tubes. Fig. 1 shows part of three adjacent fuel tubes, of which reference is made herein only to an upper fuel tube 3 and a lower fuel tube 4.

The outer diameter of the tubes is such that a clearance C is defined between the wall of the channel and the outer surface of the fuel tubes when the latter are arranged end to end in superposition with the channel. The adjacent end faces of the fuel tubes 3, 4 are inclined to the horizontal and are separated by a spacer ring 5 whose internal diameter is equal to that of the fuel tubes 3, 4. The ring 5 is in two similar halves 5a, 5b forming two interlocking parts. The upper half 5a is coupled to the lower half 5b by a lug and groove interconnection 6, the grooves of which are formed oversize to provide clearances 6a in order to accommodate expansion of the ring in operation, whilst the faces 6b closely engage each other. As indicated in FIG. 2, the ring 5 is positioned such that the interconnection 6 is at a medial region between the upper and lower extremities of the planes of contact, the closely engaging faces 6b lying in a vertical plane containing the longitudinal axis of the fuel tubes and at right angles to the radial component F1 set up by the application of an axial force F2 applied to the upper fuel tube. The axial force F2 may be provided by the weight of the upper fuel tubes themselves or by a device which applies a downward force to the uppermost fuel tube.

The periphery of the ring has four outwardly extending projections 7a–7d, two on each part 5a, 5b of the ring 5, each projection presenting a part spherical surface 8 to the inner wall of the channel 2. The projections 7a, 7b on the upper part 5a of the ring 5 extends axially downwards so as to lap over the edge of the lower fuel tube 4 serving to space this tube from the channel wall.

The lower part 5b of the ring 5 has projections 7c, 7d which similarly extend to the channel wall, but extend also upwardly to lap over the edge of the upper fuel tube 3. The ring 5 can thus be considered to hang upon the edge of the lower tube 4 by projections 7a, 7b and present upwardly extending projections 7c, 7d to the rim of the upper fuel tube 3. As shown in FIG. 2, the position of the projections around the periphery is such that the peripheral portion of the ring being the pair of projections 7c, 7d sub-tends an angle γ at the channel axis whose bisector β lies along the line of the aforementioned radial component E1.

The ring 5 may be made of any material, e.g., alumina, which will not affect to any substantial extent the neutron economy of the system and which will not weld itself to the fuel tubes under the effects of heat and radiation.

In operation, the fuel tubes are subjected to an axial force F2 within the limits of their compressive strength and, as has been proposed hitherto, the radial component F1 of this force set up by virtue of the inclined planes of contact between the fuel components is used to hold the fuel components steadily in a central position within the channel. However, contact with the channel wall is made through the projections 7a–7d on the ring 5 which spaces apart adjacent ends of the fuel tubes preventing the ends from sticking or welding together. Dimensional changes in the fuel tubes 3, 4 and the ring 5 can be accommodated under operating conditions by sliding in the inclined planes of contact between the fuel tubes 3, 4 and the ring 5.

I claim:

1. A vertical coolant channel extending within a body of moderating material, a plurality of refractory tubes including nuclear fuel material arranged end to end in superposition within the chanel, the tubes having a diameter relative to that of the channel such that a clearance is defined between between the tube and the channel wall, end faces on said tubes lying in a plane oblique to the axis of the tubes, a spacer ring between adjacent end faces, and projections on said ring extending into said clearance to abut the wall of the coolant channel due to the radial component of force set up by an axially downward force on the fuel tubes thereby tending to maintaining the tubes co-axial with the channel.

2. A vertical coolant channel as claimed in claim 1 in which the ring has a peripheral portion extending between a pair of said projections which subtends an angle at the channel axis, said angle having a bisector lying along the line of a radial component of a force due to the application of a downward force applied exially to the fuel components.

References Cited by the Examiner

UNITED STATES PATENTS

| | | | |
|---|---|---|---|
| 2,983,662 | 5/61 | Shillitto et al. | 176—30 |
| 2,985,575 | 5/61 | Dennis et al. | 176—43 |
| 3,105,035 | 9/63 | Weems | 176—77 |

FOREIGN PATENTS 875,462  8/61  Great Britain.

CARL D. QUARFORTH, *Primary Examiner.*